April 24, 1962    D. W. YOUNG ET AL    3,031,495
PREPARATION OF TERTIARY ALKYL FORMATE AND ACETATE
Filed May 13, 1960
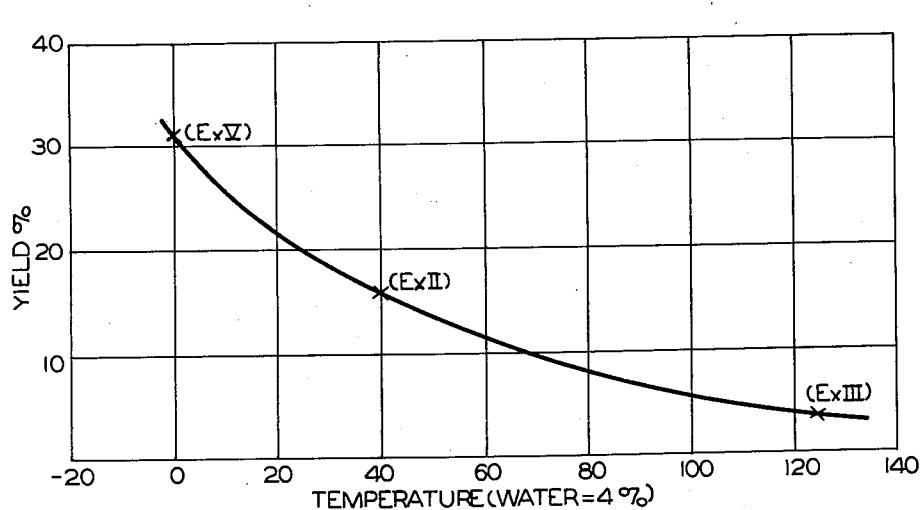
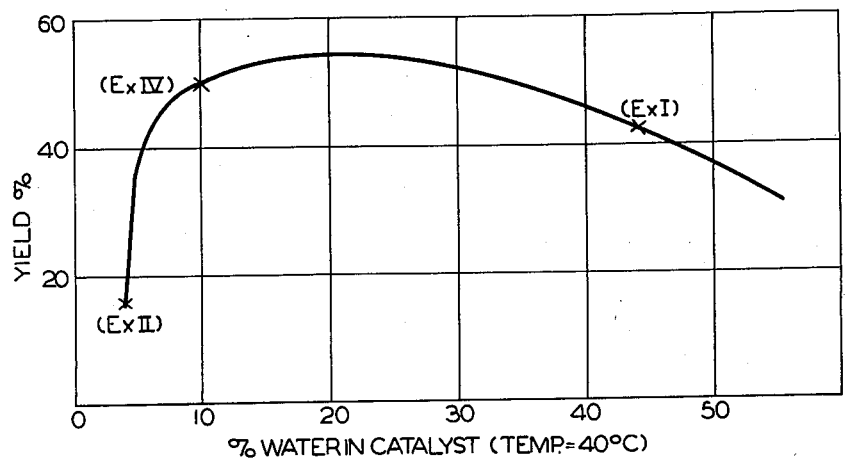
INVENTOR
DAVID W. YOUNG,
EILEEN M. PARÉ
BY Adams, Forward, McLean
ATTORNEYS

United States Patent Office 3,031,495
Patented Apr. 24, 1962

3,031,495
PREPARATION OF TERTIARY ALKYL FORMATE AND ACETATE
David W. Young, Homewood, and Eileen M. Paré, Park Forest, Ill., assignors to Sinclair Refining Company, New York, N.Y., a corporation of Maine
Filed May 13, 1960, Ser. No. 29,113
11 Claims. (Cl. 260—497)

This invention is a method for the preparation of tertiary alkyl formate and acetate. The method esterifies formic or acetic acid with a tertiary olefin while in the presence of an acidic cationic exchange resin. The application is a continuation-in-part of our copending applications Serial Nos. 730,511, filed April 24, 1958, now abandoned and 812,254, filed may 11, 1959, now abandoned. The tertiary ester products of this invention have a branched structure in the alkyl component and the acid residue is attached to the same carbon as the branch. Isobutyl formate, 3-methyl-3-pentyl acetate, 2-methyl-2-hexyl acetate, 3-ethyl-3-pentyl acetate, etc., may be made by the process of this invention. These esters are of value as plasticizers for resins and as solvents. Tert-butyl acetate has been suggested in U.S. Patents Nos. 2,228,662 and 2,334,006 as a gasoline blending agent for improving the octane rating of gasoline.

Although it has been reported in U.S. Patent 2,678,332 that olefins and organic acids may be converted to esters by contact with a dry hydrogen cation resin at about 80° C. to about 210° C., we have found that this process is not suitable for conversion of tert-olefins in commercially acceptable yields. Also, Taylor, reporting in J. Chem. Soc., 1852 (1937), managed to synthesize and isolate tertiary butyl formate by reacting tertiary butyl chloride with formic acid while in the presence of calcium formate. His reported yields are rather low, however, and his saponification equivalent was 113.7 in contrast to the calculated equivalent of 102.3. Also Kondakoff, J. Prakt. Chem., 48, 467 (1893), prepared tertiary amyl formate by adding formic acid to trimethylethylene using zinc chloride as a catalyst. Barkenbus, Naff and Rapp in the J. of Organic Chem., vol. 19, p. 1316 (1954) reported the formation of tertiary alkyl formates using olefins and formic acid in the presence of sulfuric acid as a catalyst and in the same paper reported the formation of tertiary butyl formate by the reaction of aluminum tertiary butoxide with n-butyl formate. As indicated previously, however, none of these methods has proven too satisfactory due to the expense and difficulty of formation of the catalyst and reactants and the expense and time-consuming operation of separating the catalyst from the reaction product after the reaction is complete. Now, in accordance with the present invention we have devised a process wherein tertiary alkyl formates and acetates can be economically obtained in good yields by reacting tertiary alkenes of 4 to 6 carbon atoms and formic or acetic acid in the presence of a cation exchange resin catalyst, the process being particularly advantageous in that polymer byproduct formation can be substantially minimized. A tertiary olefin is a hydrocarbon containing a carbon atom which is joined to two other carbon atoms by a single bond and to a third carbon atom by a double bond. The olefin may be fed alone or as a mixture with other hydrocarbons; for example, a $C_4$ refinery stream with 10 to 35% isobutylene may be used in this process as well as pure isobutylene.

The esterification is performed using a polystyrene sulfonic acid cation exchange resin in the hydrogen form. The resin is comprised of a polystyrene material cross-linked with a copolymerizing agent which may be substituted diene, triene, etc., such as divinylbenzene. The preferred cationic exchange resin is a strongly acidic solid exchange resin consisting essentially of a divinylbenzene cross-linked polystyrene matrix having about 0.5 to 20%, preferably about 5 to 16%, divinylbenzene therein, to which are attached ionizable or functional nuclear sulfonic acid groups. This resin is manufactured and sold commercially under various trade names, e.g. Dowex 50, Nalcite HCR.

Resins having particle sizes of from about 200 to 400 mesh are preferred for use in this invention although smaller or larger sizes can be used if desired. These resins, as commercially obtained, have a moisture content in the neighborhood of about 50%. The moisture content, if desired, can be reduced, as for example, by heating at a temperature of about 212° F. for 12 to 24 hours, or free water can be removed as by refluxing with benzene or a similar solvent and then filtering. A fully dried resin may be used, but good yields of acetate dictate the presence of at least some water in the resin.

In making the formate, the present process preferably comprises contacting formic acid having a concentration of at least about 95% based on formic acid and water, preferably about 98% to 100%, with tertiary alkenes having 4 to 5 carbon atoms while in the presence of catalytic amounts of a divinylbenzene cross-linked polystyrene solid cationic exchange resin at conditions defined by the following relationship: $X=TY$, wherein X is a number not more than about 50, Y is the percentage of the dry catalyst resin and not exceeding about 10% based on the weight of the acid feed, and T is the temperature in degrees centigrated at which the reaction is conducted and is not more than about 70° C. Although the present esterification reaction will proceed under conditions outside the above relationship we have found that if the reaction conditions are such that X is greater than about 50, the yields of formate ester will be substantially reduced with a corresponding increase in the amount of polymer by-product formation. The above-mentioned U.S. Patent 2,678,332 shows no work on the formation of tertiary alkyl formates and does not recognize the important relationship existing between the temperature and the percentage of catalyst in the reaction mixture when attempting to obtain these formates in good yields.

In accordance with the temperature-catalyst relationship above set forth, the amount of the resin in the formate reaction mixture can vary, the amount being related to the temperature at which the reaction is conducted. Generally, however, the resin will not exceed about 10, preferably not above about 5, weight percent (dry basis) based on the weight of the formic acid fed to the reaction zone, and it should be present in amounts of at least about 0.1, preferably at least about 0.25, weight percent on a dry basis. The resin can preferably have particle sizes of from 200 to 400 mesh although higher or lower sizes can be utilized if desired.

As indicated previously, the temperature at which the formate reaction is most advantageously conducted is integrally related to the amount of the catalytic resin in the reaction mixture and so long as the above-indicated formula is met the temperature can vary over a range of up to about 70° C. The temperature is usually in the range of about —5° to 70° C., preferably about 20 to 45° C. The pressure on the system can be any that is desired and the reaction can be in the liquid or vapor phase. When using isobutylene the vapor phase reaction is preferred. For instance, the pressure can vary from atmospheric upward although no advantage has been obtained by using pressures exceeding about 100 p.s.i.

In manufacturing tertiary alkyl acetate the process of this invention advantageously comprises contacting a tertiary olefin of 4 to 6 carbon atoms with acetic acid at a temperature of about 0 to 60° C. in the presence of the hydrogen cation exchange resin containing about 5 to 50% water. The preferred temperature is about 25 to 45° C. and the resin preferably contains about 5 to 20% water. The polystyrene sulfonic acid cation exchange resin catalyst is used in an amount sufficient to catalyze the conversion to the acetate, usually about 5 to 30%, preferably about 8 to 25% by weight of the acid on a dry resin basis. The starting olefins are characterized by the structure:

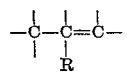

where R is an alkyl including substituted alkyls. The acetic acid is preferably used in the substantially anhydrous, glacial form.

Pressure conditions in the acetate reaction may vary widely. Atmospheric pressure may be used, but better yields are usually obtained if the reaction takes place using sufficient pressure to keep a normally gaseous olefin in the liquid state. The contacting may be performed batchwise or a continuous, e.g. countercurrent system may be established for the contacting.

The present invention can best be illustrated by reference to the following examples, none of which, however, is to be considered as limiting the scope of the instant invention. The procedure utilized in each of the examples can be briefly described as follows. The tertiary alkene was contacted in a glass bottle containing the desired amount of the catalyst resin and the acid. If the alkene is a gas it can be bubbled through the mixture and if in a liquid state it can be merely agitated with the catalyst and the acid. The bottle was vented to the atmosphere and provided with an ice bath when necessary. When approximately 100% yield was obtained, assuming that the tertiary alkyl ester was the only reaction product formed the reaction was discontinued and the sample washed and/or distilled as the particular case might be. Unless otherwise indicated the resin was in its wet form and contained about 50% moisture.

EXAMPLE I

Acetic acid (358 g.) and isobutylene (660 g.) were charged to a one-gallon autoclave with 200 to 400 mesh Dowex 50–X8 (71.6 g.) as the catalyst. The catalyst contained 8% divinylbenzene and 44% water and the mesh size was 100 to 200 mesh. The weight of catalyst used was approximately 20% of the weight of acid used. The reaction was run for 8½ hours at a maximum temperature of 40° C. and a maximum pressure of 140 lbs. The reaction product was removed from the autoclave by suction and washed five times with ice water before drying it over anhydrous magnesium sulfate. The product was filtered and distilled at 740 to 745 mm. Hg, giving 298 g. of a t-butyl acetate fraction boiling in the range of about 95 to 97° C. This fraction was decolorized with charcoal and upon analysis of carbon and hydrogen was shown to be about 97% t-butyl acetate.

EXAMPLE II

The same run as in Example I was made using the same amounts of reactants and catalyst, but the resin had previously been dried for 24 hours at 105° C. and contained only 4% water. The yield of product (tert-butyl acetate) was only 107 grams.

EXAMPLE III

The same catalyst and conditions as in Example II were employed in a reaction which took place at 125° C. The yield of product (tert-butyl acetate) was only 22.8 grams.

EXAMPLE IV

A run was made using the conditions of Example I except that the Dowex 50–X8 catalyst contained 10% water. The yield of t-butyl acetate was 341 grams.

EXAMPLE V 251 g. (4.2 m.) glacial acetic acid and 50 g. (20% by weight of acetic acid) Dowex 50–X8, containing 4% water, were placed in a 500 ml. gas absorption bottle through which isobutylene gas was bubbled at an average rate of 32 liters per hour. The reaction was run at atmospheric pressure with the reaction vessel being immersed in an ice-water bath. After four hours the gas flow was discontinued and the reaction mixture washed three times with cold water. The product was then dried over anhydrous magnesium sulfate for 24 hours. After filtering, the sample weighed 216 g. Distillation under vacuum gave the following cuts:

| Pot Temp., °C. | Overhead Temp., °C. | Pressure (mm. Hg) | Calc. Equiv. Temp. at 760 mm. | Cut | Sample Wt., g. | $n_d^{25}$ |
|---|---|---|---|---|---|---|
| 27.5 | 29 | 60 | 95 | 1 | 40.7 | 1.3851 |
| 29.5 | 29 | 59 | 96 | -- | ------ | ------ |
| ------ | 29 | 55 | 97 | -- | ------ | ------ |
| 34 | 33 | 66 | 97 | 2 | 40.3 | 1.3851 |
| 35 | 32 | 62 | 98 | -- | ------ | ------ |
| 37 | 34.5 | 68 | 98 | 3 | 48.3 | 1.3850 |
| 36.5 | 34 | 65 | 99 | -- | ------ | ------ |
| 36 | 32.2 | 59 | 99 | -- | ------ | ------ |
| 36 | 32.5 | 59 | 99 | 4 | 19.4 | 1.3854 |
| ------ | 32.5 | 56 | 101 | -- | ------ | ------ |

Total Weight: 148.7 g. of t-butyl acetate product.
Theoretical Yield: 116×4.2=487 g.

Actual Yield: $\frac{148.7}{487}$=30.6%.

Table I gives the results of five acetate runs:

Table I

| Run | I | II | III | IV | V |
|---|---|---|---|---|---|
| Acid (gms.) | 358 | 358 | 358 | 358 | 251 |
| Acid (moles) | 5.95 | 5.95 | 5.95 | 5.95 | 4.2 |
| Ratio, dry cat./acid, percent | 11 | 19.2 | 19.2 | 18 | 19.1 |
| Percent Water in cat | 44 | 4 | 4 | 10 | 4 |
| Temp., °C | 40 | 40 | 125 | 40 | 0 |
| Yield, percent | 41.7 | 15.5 | 3.3 | 49.3 | 30.6 |

These results are graphed in FIGURES 1 and 2 of the accompanying drawing and show the poorer results of using a resin containing too little water, especially at elevated temperatures (FIG. 1), as well as the improvement in yield obtained when the reaction is performed at a temperature of 0 to 60° C. with a resin catalyst containing 5 to 50% water (FIG. 2).

EXAMPLE VI

Tertiary amyl acetate was prepared by charging 125 g. 2-methyl butene-2 and 93.5 g. glacial acetic acid to a one-pint glass bottle half full (210 gms.) of Dowex 50–X8 resin containing 15% water. The bottle was stoppered and left at room temperature for 10 days, being shaken occasionally during this time. The contents of the bottle were then removed and after being washed five times with cold water the product weighed 110 grams. After this sample was dried over MgSO₄ for two days and distilled under vacuum (10 mm. Hg), a heart cut of tertiary amyl acetate, boiling at 124 to 125° C. (760 mm. basis) and weighing 27 grams was obtained.

EXAMPLE VII 186 grams of 98+% formic acid were contacted with 6 grams (3.2% on dry basis) of 200 to 400 mesh Dowex 50–X8 sulfonated polystyrene cross-linked with 8% divinylbenzene which had been previously dried for 24 hours at 100° C. Isobutylene gas was added slowly and the temperature of the mixture rose to about 65° C. After one hour two distinct layers were formed. At the end of ten hours the total weight was about 555 grams. The product was filtered to remove the insoluble catalyst and the filtrate washed with water, dilute NaHCO₃, ice water and then dried over Drierite. Two samples of the product were distilled using a Bantam ware-Kontes column at atmospheric pressure. Analysis of the product was as follows:

| | Bantam ware—No vacuum | | | | |
|---|---|---|---|---|---|
| | Percent | Percent C | Percent H | $n_d^{25}$ | $D_4^{25}$ |
| Cut 1 (73–77° C.) | 19.5 | | | | |
| Cut 2 (78–80° C.) | 30.3 | 64.21 | 10.82 | 1.3828 | 0.8369 |
| Cut 3 (92–150° C.) | 5.3 | | | | |
| Cut 4 (160–174° C.) | 35.6 | 85.95 | 14.50 | 1.4280 | 0.7556 |
| Cut 5 (bottoms) | 6.2 | 85.43 | 14.37 | 1.4365 | 0.7750 |
| Calculated $C_5H_{10}O_2$ | | 58.9 | 9.8 | | |
| Calculated $(C_4H_8)_x$ | | 85.7 | 14.3 | | |

These results indicate that at this temperature and catalyst percentage the product formed although containing about 30.3% formate (cut 2) also contained a substantial amount of polymer by-product (cuts 3, 4 and 5, primarily trimer boiling at about 102° C. at 85 mm. Hg).

The following figures were used as a standard of comparison: The calculated values for percent C and percent H based on $C_5H_{10}O_2$ are 58.9 and 9.8, respectively. The analyses for tertiary butyl formate as obtained by Barkenbus, Naff and Rapp published in J. Org. Chem., 19, 1316 (1954) are as follows:

$N_D^{25}$ ------------------------------------- 1.3783
$D_4^{24}$ ------------------------------------- 0.8718
B.P. (° C. at 760 mm. Hg) ------------------- 82.8

EXAMPLE VIII

Isobutylene gas was bubbled through 115 grams of 98+% formic acid mixed with 5 grams of Dowex 50–X8 (2.2% on a dry basis). In four hours at 25 to 40° C. the product weight was 255 grams which corresponds to the theoretical yield of t-butyl formate. The product was filtered through paper to remove the catalyst but not washed. One-half of the liquid product was distilled under vacuum giving a fraction boiling between 82 to 84° C. at 760 mm. Hg. This distillate upon analysis gave the following results:

Percent C ----------------------------------- 61.55
Percent H ----------------------------------- 10.44
$N_D^{25}$ ------------------------------------- 1.3817

Comparison of these results with those set forth as the standard in Example I also indicates some polymer by-product formation even at the reduced temperature utilized in this run.

EXAMPLE IX

In order to show the effects of catalyst concentration on the product formed, several runs were conducted substantially as outlined above. The catalyst used was wet (50% moisture) Dowex 50–X8 (200 to 400 mesh) and was used in the concentrations set forth in Table II below. The reactions were run for 2½ hours with the temperature being recorded at the end of the first hour.

*Table II*

| Run | Percent Catalyst | Temp., ° C. |
|---|---|---|
| 1 | 0.56 | 45 |
| 2 | 1.27 | 65 |
| 3 | 2.56 | 65 |
| 4 | 5.27 | 65 |

All the samples were washed with ice water and dried over anhydrous magnesium sulfate. The rate of reaction for each catalyst concentration was essentially the same with the exception of run 1 wherein was noted a very significant increase in reaction time. Runs 3 and 4 gave two distinct layers indicating polymer formation. Distillation of these two runs (3 and 4) showed a formation of polymer in amounts of 50% or greater with run 3 showing slightly less polymer formation than run 4. The product of run 2 while developing a slight second layer after standing at room temperature for several days indicated after distillation only very slight polymer formation, while the product of run 1 indicated no polymer formation.

EXAMPLE X

Isobutylene gas was bubbled into 188 grams of 98+% formic acid containing 2.5 grams (0.7% on dry basis) of Dowex 50–X8 resin (200 to 400 mesh). After 7 hours at 20 to 35° C. the sample weight was 394 grams. The catalyst was removed by filtration and washed with ice water, cold $NaHCO_3$, and ice water and then dried over anhydrous magnesium sulfate. The weight of the dried product was 329 grams or 71.3% of theory. This material had a boiling point of 21.1 to 21.3° C. at 66 mm. Hg or 825° C. at 760 mm. Hg. The calculated boiling point at 760 mm. Hg using S. B. Lippincott-Nomo-chart (see 38 Ind. Eng. Chem. 320), was 83° C. This product analyzed as follows:

Percent C ----------------------------------- 59.6
Percent H ----------------------------------- 10.2
$D_4^{25}$ ------------------------------------- 0.8712
$N_D^{25}$ ------------------------------------- 1.3790

Although the figures obtained from the C and H percentage in this product are not in exact agreement with the calculated percentages (Example VII) they are good in comparison to those obtained for the product of Examples VII and VIII. The $N_D^{25}$ and $D_4^{25}$ values of this product are in close agreement to that obtained by Barkenbus, Naff and Rapp (supra) indicating a relatively pure formate product uncontaminated with polymer by-product.

EXAMPLE XI 70 grams of t-amylene and 46 grams of 98+% formic acid were agitated slightly for 2 days at room temperature in a 500 cc. glass stoppered bottle using 1.75 grams (1.9% on dry basis) of Dowex 50–X8 (200 to 400 mesh) as the catalyst. The resin was then removed by filtration and the product washed with ice water and dried over anhydrous magnesium sulfate. The product was distilled through a 20 plate column. Tertiary amyl formate (41.8% yield) was collected at 24 to 25° C. at 27 to 28 mm. Hg. The calculated boiling point of the product at 760 mm. Hg was 112.5° C. while the literature gives the boiling point of this product as 112.9° C. No polymer formation was observed.

EXAMPLE XII

Isobutylene, 90% formic acid and 5% wet resin based on the weight of the formic acid were reacted at 20° C. for eight hours with no ester formation taking place. Likewise 5% of dry resin based on the weight of 90% formic acid failed to yield any ester formation.

EXAMPLE XIII 122 liters of isobutylene were bubbled through a reaction flask containing 205 gms. of 98% formic acid and 10 grams (2.5% on dry basis) of Dowex 50–X8. The temperature was maintained at room temperature (20° C.) for 5½ hours. The sample was washed with ice water and then dried over anhydrous $MgSO_4$. Upon distillation all the product boiled within the range of about 80 to 82.5° C. and a yield of about 202 gms. (44.5%) tertiary butyl formate was obtained. No polymer by-product was formed.

EXAMPLE XIV

Under the same conditions as indicated in Example XIII with the exception that 5% dry catalyst was used rather than 5% wet catalyst, the yield of tertiary butyl formate was about 29.5% and about 14.6% polymer by-product was formed.

EXAMPLE XV

By lowering the reaction temperature of Example XIV to about 0° C., however, formate ester was recovered in yields of about 39.4% and no polymer by-product was formed.

From an examination of the above examples it can readily be seen that only those formic acid reactions wherein the conditions met the formula $X=TY$ with X being not more than about 50, produced good yields of the desired formate product with substantially no polymer by-product formation. Values of X exceeding about 50 produced substantial amounts of polymer.

We claim:

1. In a process for the preparation of tertiary alkyl acetate while substantially limiting polymer by-product formation, the step comprising contacting acetic acid with a tertiary olefin of 4 to 6 carbon atoms at a temperature of about 0 to 60° C. in the presence of about 5 to 30% by weight of the acid of a catalyst consisting essentially of a divinylbenzene cross-linked polystyrene sulfonic acid cationic exchange resin in the hydrogen form containing about 5 to 50% water.

2. The process of claim 1 where the olefin is isobutylene.

3. The process of claim 1 where the temperature is about 25 to 45° C.

4. The process of claim 1 where the catalyst resin contains about 5 to 20% water.

5. In a process for the preparation of tertiary butyl acetate while substantially limiting polymer by-product formation, the step comprising contacting acetic acid with isobutylene at a temperature of about 25 to 45° C. in the presence of about 5 to 30%, by weight of the acid, of a catalyst consisting essentially of a divinylbenzene cross-linked polystyrene sulfonic acid cation exchange resin in the hydrogen form containing about 5 to 20% water.

6. In a process for the preparation of tertiary alkyl formate while substantially limiting polymer by-product formation, the step comprising contacting formic acid having a concentration of at least about 95% with a tertiary olefin of 4 to 5 carbon atoms at a temperature in degrees centigrade not exceeding about 70 in the presence of about 0.1 to 10% by weight of the acid feed of a catalyst consisting essentially of a divinylbenzene cross-linked polystyrene sulfonic acid cation exchange resin in the hydrogen form at conditions defined by the relationship $X=TY$, wherein X is a number not more than about 50, T is the temperature in degrees centigrade and Y is the weight percent catalyst based on the acid feed.

7. A process as in claim 6 wherein the tertiary olefin is isobutylene in the vapor phase.

8. In a process for the preparation of tertiary alkyl formate, the step comprising contacting formic acid having a concentration of at least about 98% and tertiary alkene having 4 to 5 carbon atoms with a catalyst consisting essentially of a divinyl benzene cross-linked polystyrene cationic exchange material in the hydrogen form at conditions defined by the relationship $X=TY$, wherein X is a number not more than about 50, T is the temperature in degrees centigrade in a range of about 20 to to 45° C., and Y is the weight percent catalyst based on the acid feed and is at least about 0.25.

9. A process as in claim 8 wherein the tertiary alkene is isobutylene in the vapor phase.

10. A process as in claim 6 where T is in the range of about 20–45° C.

11. A process as in claim 6 where Y is in a range of about 0.25 to 5.

References Cited in the file of this patent

UNITED STATES PATENTS 2,678,332   Cottle _____ May 11, 1954

OTHER REFERENCES

Nachod et al.: "Ion Exchange Technology," 1956, pp. 24–25.

Houben-Weyl: "Methoden Der Organischen Chemie," "Sauerstoffverbindungen III," 1952, 4th edition, pp. 534–535.